No. 626,204. Patented May 30, 1899.
C. GLOVER.
HINGE.
(Application filed Apr. 4, 1899.)
(No Model.)
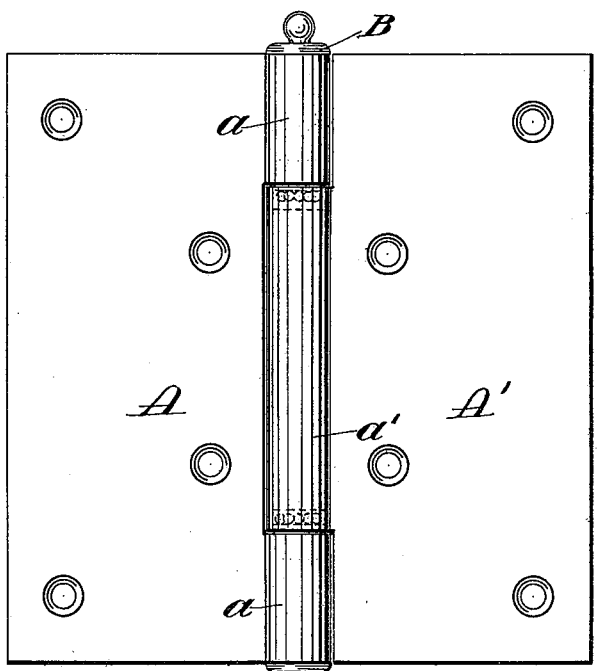
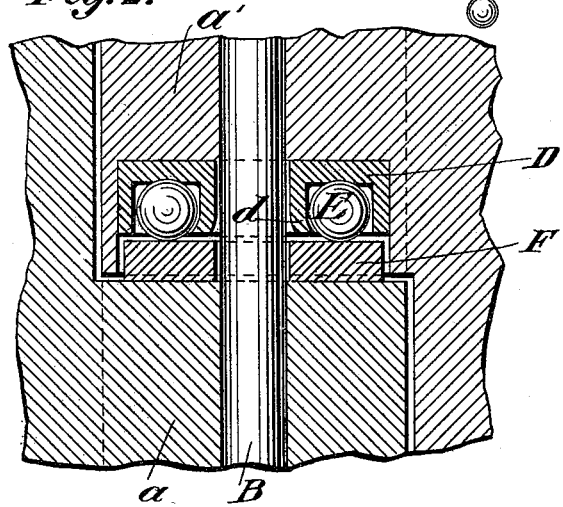
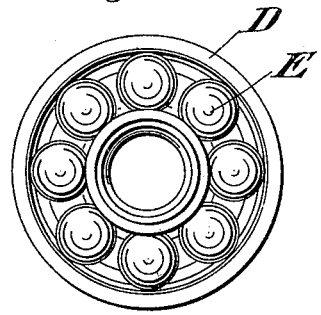
WITNESSES:
INVENTOR
Charles Glover.
BY
ATTORNEY

UNITED STATES PATENT OFFICE.

CHARLES GLOVER, OF NEW BRITAIN, CONNECTICUT, ASSIGNOR TO THE P. & F. CORBIN, OF SAME PLACE.

HINGE.

SPECIFICATION forming part of Letters Patent No. 626,204, dated May 30, 1899.

Application filed April 4, 1899. Serial No. 711,761. (No model.)

*To all whom it may concern:*

Be it known that I, CHARLES GLOVER, a citizen of the United States, residing at New Britain, county of Hartford, State of Connecticut, have invented certain new and useful Improvements in Hinges, of which the following is a full, clear, and exact description.

My invention relates to improvements in butts and hinges; and it consists particularly in improving the bearing portion thereof, so that irrespective of the weight of the parts supported by said hinge the same may be readily turned.

The chief object of this improvement is to provide in a butt or hinge an antifriction-bearing so constructed and so arranged in the hinge as to be practically dust-proof and invisible, very desirable features of novelty in ball-bearing hinges.

A further object is to so arrange the parts that the antifriction devices will not unduly bind or crowd out of their predetermined path of movement and so that said antifriction devices cannot become accidentally detached.

In the drawings, Figure 1 is a front view of a hinge, the leaves being open. Fig. 2 is a relatively-enlarged vertical sectional view of a portion of the hinge shown in Fig. 1. Fig. 3 is a detail of the bushing D and the balls E.

A A' are hinge-leaves. $a$ $a'$ are knuckles on said leaves respectively. B is a pintle. In order to give room between the closely-assembled knuckle-joints for the several parts of the antifriction-bearing, I form in the ends of said knuckles recesses of a size and depth sufficient to carry below the end of said knuckle the balls E, and also preferably a lining, in this embodiment a bushing D, that may be of hardened metal, against which the balls get an improved bearing. By "hardened" I merely mean that the lining is harder than the material of the knuckle—for instance, a brass knuckle and a steel or iron lining. I do not mean that such a steel or iron lining must necessarily itself be hardened over what it is in its natural state. An important advantage of forming these recesses in the ends of the knuckles of the depth above mentioned is that it permits, in the manner hereinafter described, of a construction that renders the antifriction devices invisible and practically dust-proof. The recess in the knuckle may be so formed as to afford an annular channel, in which the balls E are placed, and such recess may be hardened or lined with hardened metal. Incidental to forming this channel a center sleeve or web $d$ is left, which may be integral with said lining, and the upper edge of the web $d$ may be spun outwardly to a sufficient extent to prevent the antifriction devices from becoming accidentally detached from the recess. The shape of the channel is preferably that shown in the enlarged sectional view, in which the balls will rest in the bottom of the channel and not press against either side to any substantial degree, and therefore the balls will not unduly bind or crowd together.

In the particular hinge shown it will be seen that one leaf has two knuckles and the other leaf has one knuckle and that it is the leaf having the single knuckle that carries the ball-bushings D. Since the ends of the knuckles should bear directly or indirectly against the antifriction devices, and since it would be practically impossible in the construction shown to cause the integral ends of said knuckles to bear against said antifriction devices, I have in this embodiment provided detachable end pieces for said knuckles $a$ $a$ in the form of washers F, which may also be hardened, if desired. These washers F are of slightly less diameter than the opening in the end of the knuckle which incloses the antifriction devices, and one face of said washer is smooth to afford a suitable bearing-surface against the antifriction devices E. The thickness of said washer should be slightly more than the distance between the outer or exposed sides of the antifriction devices and the end of the knuckle in which said devices are located. Thus when the parts are assembled the detachable end pieces F for the knuckles $a$ will be located as shown in the drawings and will occupy the open space between the ends of the knuckles, which space is so slight as to be hardly visible, thus giving to the hinge a smooth and substantially unbroken finish. The presence of the detachable end pieces F in these spaces and the fact that the said end pieces entirely cover the antifriction devices seals and protects the latter from the dust and dirt that would otherwise accumulate to the impairment of their effectiveness. The lining D may be made, if desired, detachable, as shown, from the supporting-knuckle, so that in the event of breakage another one might be readily substituted.

What I claim is—

1. In a hinge a plurality of leaves and knuckles thereon, a recess in the end of one of said knuckles, a hardened lining in said recess said lining having an annular channel and a central web, balls in said channel, the edge of said web being spun outwardly to retain said balls, the wall around said lining and balls projecting beyond the exposed surfaces of said balls, and a detachable end piece for the adjacent knuckle said end piece projecting loosely into the recess in the first-mentioned knuckle and against the antifriction-balls therein when the parts are assembled, and a pintle passing through said knuckles.

2. In a hinge a plurality of leaves each of the same having a knuckle, a recess in the end of one of said knuckles, antifriction devices located in said recess, the wall of said recess projecting beyond the exposed surfaces of said antifriction devices, and a detachable projection from the adjacent knuckle extending into the recess in the first-mentioned knuckle and forming a bearing for said antifriction devices therein when the parts are assembled.

Signed at New Britain, Connecticut, this 28th day of March, 1899.

CHARLES GLOVER.

Witnesses:
 A. H. GAMERDINGER,
 II. HERBERT WETHERILL.